(12) United States Patent
Chatroux et al.

(10) Patent No.: US 10,164,454 B2
(45) Date of Patent: Dec. 25, 2018

(54) DC VOLTAGE SUPPLY SYSTEM CONFIGURED TO PRECHARGE A SMOOTHING CAPACITOR BEFORE SUPPLYING A LOAD

(71) Applicant: COMMISSARIAT A L'ENERGIE ATOMIQUE ET AUX ENERGIES ALTERNATIVES, Paris (FR)

(72) Inventors: Daniel Chatroux, Teche (FR); Bruno Beranger, Saint-Martin d'Uriage (FR); Sebastien Carcouet, Vif (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 200 days.

(21) Appl. No.: 15/118,749

(22) PCT Filed: Feb. 3, 2015

(86) PCT No.: PCT/FR2015/050251
§ 371 (c)(1),
(2) Date: Aug. 12, 2016

(87) PCT Pub. No.: WO2015/121564
PCT Pub. Date: Aug. 20, 2015

(65) Prior Publication Data
US 2017/0047758 A1 Feb. 16, 2017

(30) Foreign Application Priority Data
Feb. 14, 2014 (FR) ...................................... 14 51214

(51) Int. Cl.
*H02J 3/38* (2006.01)
*H02J 7/34* (2006.01)
(Continued)

(52) U.S. Cl.
CPC .......... *H02J 7/0068* (2013.01); *H02J 7/0081* (2013.01); *H02J 7/14* (2013.01); *H02J 7/345* (2013.01); *H02M 1/36* (2013.01)

(58) Field of Classification Search
CPC .. H02J 7/14; H02J 7/345; H02J 7/0068; H02J 7/0081
See application file for complete search history.

(56) References Cited

U.S. PATENT DOCUMENTS 7,602,229 B2 * 10/2009 Tolle ................ H03K 17/04123
327/108
8,432,058 B2 * 4/2013 Matsukawa ........... H02J 7/0077
307/10.1
(Continued)

FOREIGN PATENT DOCUMENTS

DE   10 2011 002 673 A1   7/2012
DE   10 2011 006 096 A1   9/2012
(Continued)

OTHER PUBLICATIONS

International Search Report dated Jun. 17, 2015, in PCT/FR2015/050251 filed Feb. 3, 2015.

*Primary Examiner* — Alfonso Perez Borroto
*Assistant Examiner* — Esayas Yeshaw
(74) *Attorney, Agent, or Firm* — Oblon, McClelland, Maier & Neustadt, L.L.P.

(57) ABSTRACT

The invention concerns an electrical system that comprises: —an electrical charge (42, 43); —a decoupling capacitor (41); —a DC voltage power supply system, comprising first and second terminals (321, 322), including: —a DC voltage source (2) comprising first and second poles; —a first branch including a first contactor (51); —a second branch including first and second switches (302, 303) and an inductor (305) connected in series in order to selectively connect the DC voltage source to the first ter-
(Continued)

minal (321) of the power supply system; —a unidirectional conducting device (307, 308, 309) for conduction from the second terminal of the DC power supply system to a connection node (323) between the second switch (303) and said inductor (305); —a control circuit (304) comprising —a mode for supplying electrical load (42, 43); —a mode for charging the decoupling capacitor (41).

10 Claims, 4 Drawing Sheets

(51) Int. Cl.
*H02J 3/06* (2006.01)
*H02J 7/00* (2006.01)
*H02M 1/36* (2007.01)
*H02J 7/14* (2006.01)

(56) References Cited

U.S. PATENT DOCUMENTS

| | | | | |
|---|---|---|---|---|
| 2007/0164693 A1* | 7/2007 | King | ............ | B60K 6/28 318/109 |
| 2009/0167217 A1* | 7/2009 | Soma | ............ | B60L 3/0046 318/376 |
| 2010/0045244 A1* | 2/2010 | Fuchs | ............ | F02D 41/2096 320/166 |
| 2012/0139479 A1* | 6/2012 | Yun | ............ | H02J 7/0004 320/107 |
| 2012/0191294 A1* | 7/2012 | Boiron | ............ | G01R 31/3278 701/33.8 |
| 2013/0049686 A1* | 2/2013 | Erhart | ............ | H02H 9/025 320/109 |
| 2013/0116875 A1* | 5/2013 | Oh | ............ | B60L 15/2045 701/22 |
| 2014/0021916 A1* | 1/2014 | Bilezikjian | ............ | B60L 3/0046 320/109 |
| 2014/0077731 A1* | 3/2014 | Kuwano | ............ | B60L 11/1809 318/139 |
| 2014/0139194 A1 | 5/2014 | Dinand Da Silva et al. | | |
| 2015/0061382 A1* | 3/2015 | Roessler | ............ | B60L 11/1803 307/10.1 |
| 2015/0256014 A1* | 9/2015 | Tzivanopoulos | ... | B60L 11/1803 320/107 |

FOREIGN PATENT DOCUMENTS

| | | |
|---|---|---|
| DE | 10 2012 219 488 A1 | 4/2014 |
| FR | 2 998 108 A1 | 5/2014 |

\* cited by examiner

DC VOLTAGE SUPPLY SYSTEM CONFIGURED TO PRECHARGE A SMOOTHING CAPACITOR BEFORE SUPPLYING A LOAD

The invention relates to a DC voltage electrical power supply system, and in particular to a power supply system equipped with contactors in order to selectively supply power to an electrical load and equipped with a function for precharging a smoothing capacitor of the electrical load.

High-power DC voltage electrical systems are undergoing substantial development. Indeed, numerous transport systems include a system for supplying DC voltage, e.g. based on electrochemical accumulator batteries.

The connection of the power supply system to the load requires precautions to be taken in order to avoid causing deterioration of the circuits. Thus, the connection of the power supply system to a load is made via contactors. Contactors allow, for example, direct currents of more than 100 A to be conducted and broken with very low losses while resisting a large number of make/break cycles. Conventionally, for safety reasons, the break carried out by the contactors is bipolar: the plus and minus poles of the power supply system are selectively connected to the load via respective contactors. Such contactors generally allow the power supply system to be isolated using a galvanic isolation that is guaranteed by opening an electrical contact by a distance of several millimeters.

In most applications, the electrical loads to be supplied with power carry out electronic switching operations. For example, inverters are most often used for supplying power to electric motors. In order to deliver or absorb the current during switching operations, a smoothing capacitor is connected to the terminals of the electrical power supply system while the load is being supplied with power. A capacitor stores energy in electrostatic form. The smoothing capacitor, also called a decoupling capacitor, allows an energy reserve to be kept as close as possible to the components used for the switching operations. Thus, current pulses may be delivered or absorbed by the capacitor, with low variations in voltage.

A motor and its inverter are typically powered up via the contactors mentioned above. In a transport motorization application, these two contactors allow the drive to be supplied with power only if the vehicle is capable of starting, and allow the drive to be disconnected in the event of a fault. An inverter often includes six transistors of IGBT type, forming three switching legs, and the motor is directly supplied with power by this inverter.

A decoupling capacitor is placed in parallel to the inverter. This capacitor is used for decoupling in order to minimize the fluctuations in the supply voltage caused by the rapid switching of the transistors when they open or close. The energy stored in the capacitor is: $\frac{1}{2}C*U^2$, where C is its capacitance and U is the voltage applied across its terminals by the power supply system.

It is therefore not possible to directly close the contactors on the inverter without the risk of having a current spike that is able to reach many thousands of amps if the capacitor is discharged, and also risking the generation of a materially damaging overvoltage due to the overvoltage caused by the parasitic inductance of the wiring on the capacitor and the transistors.

This particularly becomes an issue when the voltages across the terminals of the power supply system exceed around a hundred volts. The wiring circuit between the power supply system and the decoupling capacitor forms a series resonance circuit. The inductance is that of the wiring circuit, conventionally of the order of 1 µH per meter of length. The capacitance is essentially defined by the decoupling capacitor. The series damping resistance of the resonance circuit is formed by parasitic resistances of the power supply system, the wiring and the capacitor.

For high-power applications, the impedance linked to the parasitic inductance of the resonance circuit becomes substantially higher than the series parasitic resistance. This impedance determines the peak amplitude of the current and the resonance oscillation. For certain voltage levels, the current on ignition may be many thousands of amps. This current degrades the contacts of the contactors, and may even weld them together. The resonance overvoltage may prove to be enough to destroy the decoupling capacitor and/or the electronic components that are supplied with power.

A precharge circuit is then used in order to overcome these problems. The function of a precharge circuit is to charge the decoupling capacitor prior to closing the contactors. The contactor of the negative terminal of the power supply system is generally closed beforehand. The precharge circuit is connected in parallel to the contactor of the positive terminal of the power supply system. The precharge circuit typically includes a contactor connected in series with a high-power resistor, as described in the document WO2013128700. When the contactor of the precharge circuit is closed, a large current flows through this circuit in order to charge the decoupling capacitor. A heavy load is then suddenly placed on the high-power resistor during charging and it must be capable of transiently storing the energy in the form of heat, which heat it will subsequently dissipate. The decoupling capacitor is charged for a predefined duration or until its voltage is close to the voltage delivered by the power supply system. The contactor of the positive terminal of the power supply system may then be closed and the precharge contactor may then be opened.

The voltage across the terminals of the decoupling capacitor is defined by exponential charging with a time constant. The time constant of this charging is defined by $\tau = R*C$, where R is the resistance of the high-power resistor of the precharge circuit. The current spike is defined by E/R, where E is the voltage across the terminals of the power supply system.

Usually, precharging is maintained for a duration that is at least equal to $3\tau$ in order to limit the difference between the voltage E and the voltage across the terminals of the capacitor when closing the contactor of the positive terminal.

If the decoupling capacitor does not charge, e.g. subsequent to a fault in the power electronics or subsequent to an input short circuit, a current of value E/R continuously flows through the high-power resistor of the precharge circuit. As the high-power resistor is dimensioned only for a current of this value to flow therethrough in a transient manner, this specific case would result in its destruction, with the risk of starting a fire. A fuse is usually positioned in series with the high-power resistor in order to open the load circuit before the destruction of this high-power resistor. However, the sizing of such a fuse is difficult and cases of thermal fatigue of such fuses have already been observed. The contactor of the precharge circuit must also have a breaking power that is at least equal to this current. Such a contactor is relatively tricky to produce for direct current and is therefore both elaborate and costly.

The voltages E and U are not equal when the contactor of the positive terminal is closed, even in the absence of a fault. In the event that the decoupling capacitor is insufficiently charged or when the electrical load starts consuming current from the start of the precharge phase, if the contactor of the positive terminal is closed after a predefined precharge duration, the difference between the voltages U and E may be even greater, at the risk of damaging the circuits. When closing the contactor of the positive terminal, the current spike is then only limited by the parasitic inductances and resistances of the circuit. If the closing of the contactor of the positive terminal is determined by a minimum value of the voltage U, the consumption by the electrical load may prevent the voltage U reaching a threshold value, thereby making the high-power resistor of the load circuit continue to be conducting, risking its destruction.

Additionally, during precharging, the energy dissipated by the high-power resistor is at least equal to the energy stored in the decoupling capacitor, thereby leading to energy losses from the power supply system.

For certain applications, the duration of the precharging phase is limited to one second or less so as to be imperceptible by the user. The precharge circuit must then be high power, of the order of multiple kilowatts, with currents of the order of ten to several tens of amps, for example. The high-power resistor must then withstand even faster and greater heating in the event of a fault of short circuit type.

The document DE10 2011 006 096 describes a system including a high-voltage battery, an inverter and an electric motor. This document pertains to a mode for balancing the charge of the low-voltage battery. At the moment of balancing the charge of the battery, a capacitor connected in parallel to the former is already charged. The inverter/electric motor assembly is decoupled from the battery in order to carry out the balancing. The balancing takes the parasitic capacitances modeled for the battery elements into account. This document does not deal with the charging current of the capacitor. This document describes an inductor connected as a bridge in an H circuit, with connections parallel to the capacitor.

The document DE10 2011 006 096 describes a method for coupling a set of accumulators to one load (connected by an inverter) associated with a capacitor. This document pertains to the problem of connecting in parallel power battery elements (for automotive use) that have different charges, with the problems of large transient currents at the moment of their parallel connection. This document describes charge control devices that control a selective connection of the accumulators to the storage device for the purpose of balancing the voltages of the accumulators and of the storage device. After the balancing, the accumulators and the storage device are all connected in parallel. This document notably does not detail the charging current of the capacitor with respect to the electrical load.

The invention aims to overcome one or more of these drawbacks. The invention thus pertains to an electrical system, such as defined in the appended claims.

The invention also pertains to a DC voltage electrical power supply system for an electrical system, such as defined in the appended claims.

Other features and advantages of the invention will become more clearly apparent from the description thereof that is given below, by way of wholly non-limiting indication, and with reference to the appended drawings, wherein:

FIG. 1 illustrates an exemplary vehicle implementing an embodiment of a power supply system. The vehicle is an electric vehicle comprising, in a manner known per se, an electrical system including an electrical power supply system 1 and an electrical load 4.

Figure 1:
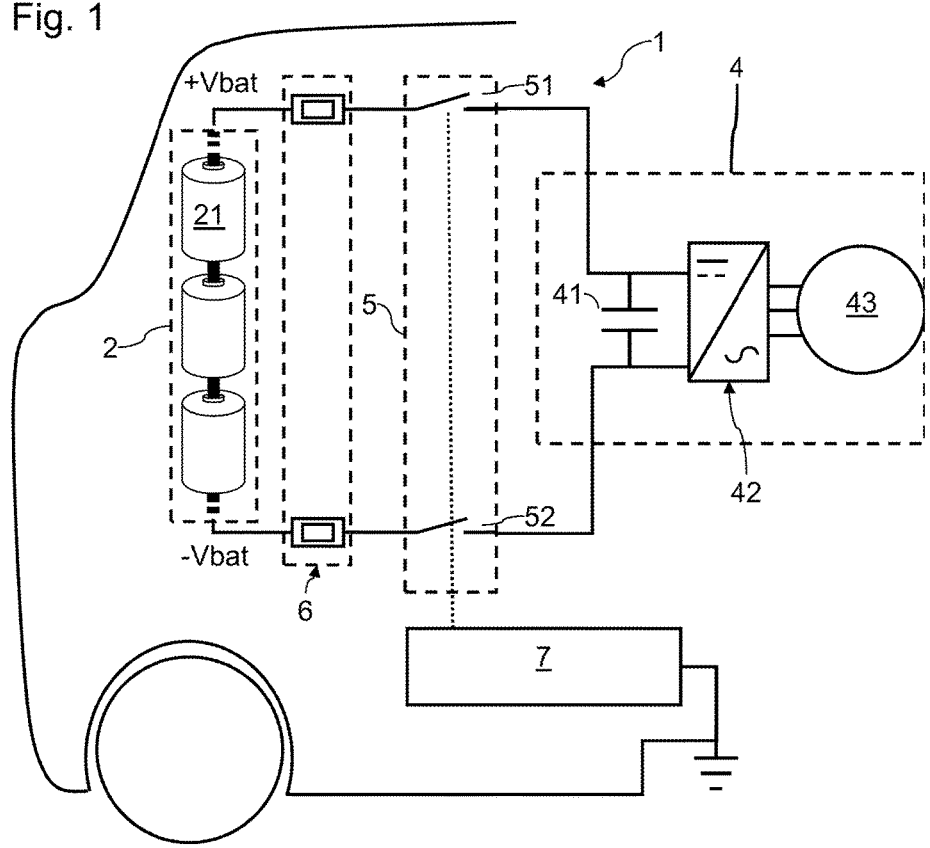
FIG. 1 is a schematic representation of an exemplary vehicle with electric motor powered by a power supply system.

The power supply system 1 comprises, in this instance, a battery 2 including electrochemical accumulators 21 connected in series. The battery 2 comprises a large number of accumulators 21 connected in series, typically between 40 and 150 accumulators, depending on the voltage required and the type of accumulators used. The voltage across the poles of the charged battery 2 is typically of the order of 400 V. The battery 2 applies a voltage +Vbat to a first pole, and a voltage −Vbat to a second pole. The accumulators 21 are connected in series via electrical power connections. The poles of the battery 2 are connected to the electrical load 4. In particular, the poles of the battery 2 are connected to a DC interface of an inverter 42. An electric motor 43 is connected to an AC interface of the inverter 42. A decoupling capacitor 41 is connected to the input interface of the inverter 42.

The connection between the poles of the battery 2 and the DC interface of the inverter 42 is made, in this example, via a protection circuit 6 and via a high-power coupling circuit 5. The protection circuit 6 may comprise, in a manner known per se, fuses configured to open the connection during a short circuit. The high-power coupling circuit 5 comprises contactors 51 and 52 allowing the poles of the battery 2 to be selectively connected to/disconnected from the DC interface of the inverter 42. The opening/closing of the switches 51 and 52 is controlled by a control circuit 7, typically a computer for supervising the operation of the battery 2. The control circuit 7 is typically powered via a battery for supplying power to the onboard network of the vehicle, exhibiting a voltage level that is much lower than that of the battery 2.

Figure 2:
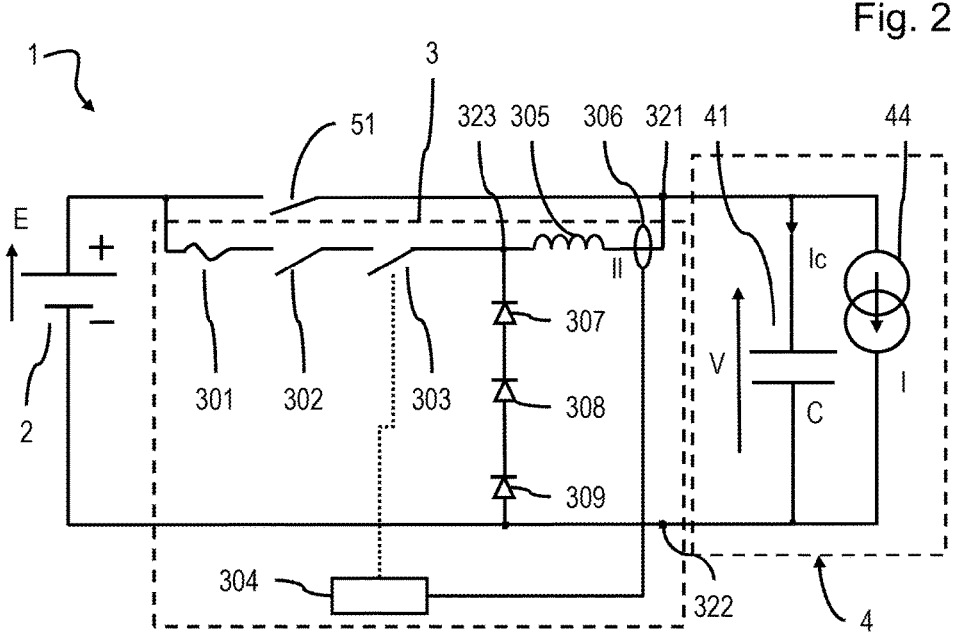
FIG. 2 is a schematic representation of a first embodiment of a power supply system according to the invention associated with an electrical load.

FIG. 2 is a schematic representation of a first embodiment of a DC voltage electrical power supply system 1 according to the invention, associated with the electrical load 4. The electrical load 4 comprises, in particular, an electrical consumer 44 that is liable to draw an electric current as soon as it is supplied with power by the system 1. The decoupling capacitor 41 is connected in parallel to the terminals of this electrical consumer 44.

The power supply system 1 comprises a DC voltage source 2 (typically a battery of electrochemical cells) having a positive pole and a negative pole. The power supply system 1 comprises first and second terminals 321 and 322 that are intended to be connected to the load 4 in order to apply a DC supply voltage thereto. The high-power coupling circuit comprises, in this instance, only one contactor 51, for the sake of simplification. The contactor 51 selectively connects the positive pole of the source 2 to the terminal 321 of the system 1. The connection between the negative pole of the source 2 and the terminal 322 is, in this instance, without a contactor. The contactor 51 forms a first connection branch between the positive pole of the source 2 and the terminal 321, the supply current from the source 2 being intended to flow through this branch after a phase of precharging the capacitor 41.

A circuit 3 selectively makes the interconnection between the positive pole of the voltage source 2 and the first terminal 321 of the system 1. The circuit 3 comprises, in particular, a switch 302, a switch 303 and an inductor 305 that are connected in series in order to selectively connect the positive pole of the source 2 and the terminal 321. The circuit 3 thus forms a second connection branch between the positive pole of the source 2 and the terminal 321, connected in parallel to the first branch. The second branch is intended to precharge the decoupling capacitor 41, before the closing of the contactor 51.

The circuit 3 additionally comprises a device for unidirectional conduction from the terminal 322 to a connection node 323 between the switch 303 and the inductor 305. The unidirectional conduction device comprises, in this instance, multiple diodes 307, 308 and 309 that are connected in series and whose anodes are connected to the lowest potential. The use of multiple diodes allows, in a manner known per se, a breakdown resistance at high voltages to be provided, without resorting to oversized diodes. Such a series connection also provides a redundancy when faced with the most likely type of malfunction of one of the diodes, namely a short circuit.

The circuit 3 additionally comprises a control circuit 304. The control circuit 304 has multiple operating modes. The control circuit 304 comprises, in particular, a mode for supplying power to the electrical load 4, wherein it keeps the contactor 51 closed and the switch 302 open. The control circuit 304 also comprises a mode for charging the decoupling capacitor 41, wherein it keeps the contactor 51 open, and wherein it keeps the switch 302 closed. In the charge mode, the control circuit 304 controls switching operations of the switch 303, so as to deliver a regulated current via the inductor 305. When both branches are open and a request for the power supply system 1 to supply power to the load 4 is received, the control circuit 304 first operates in the mode for charging the capacitor 41, before toggling to the mode for supplying power to the load 4.

The electrical consumer 44 may need to draw an electric current from the start of the mode for supplying power to the electrical load. For example, the electrical load 4 may comprise an electric motor and a circuit for controlling the electric motor. The control circuit of the electric motor must then be supplied with power prior to the supply of power to the electric motor itself. The maximum current that the electrical consumer 44 is liable to consume will be denoted by Im. The control circuit 304 is configured to regulate the current via the inductor 305 at a level Ir that is higher than this value Im during the mode for charging the capacitor 41. Thus, even if the electrical consumer 44 achieves maximum current consumption from the start of the mode for charging the capacitor 41, charging of the decoupling capacitor 41 may be guaranteed.

When the control circuit 304 determines that the difference between, on the one hand, the voltage across the terminals 321 and 322 and, on the other hand, the voltage across the positive and negative poles of the source 2 is below a first threshold, it toggles to the mode for supplying power to the load 4. The control circuit 304 then closes the contactor 51 and opens the switch 302. The size of this first threshold may, for example, be an absolute value (e.g. 5 V) or a percentage of the nominal voltage across the poles of the source 2 (e.g. 5%).

In order to implement the regulation of current, a probe 306 measures, in this instance, the series current Il flowing through the inductor 305. The value measured by the probe 306 is sent to the control circuit 304. The control circuit 304 regulates the mean current delivered via the inductor 305 to the level Ir=Im+Ig, where Ig is a minimum guaranteed charging current value for the capacitor 41.

Figure 3:
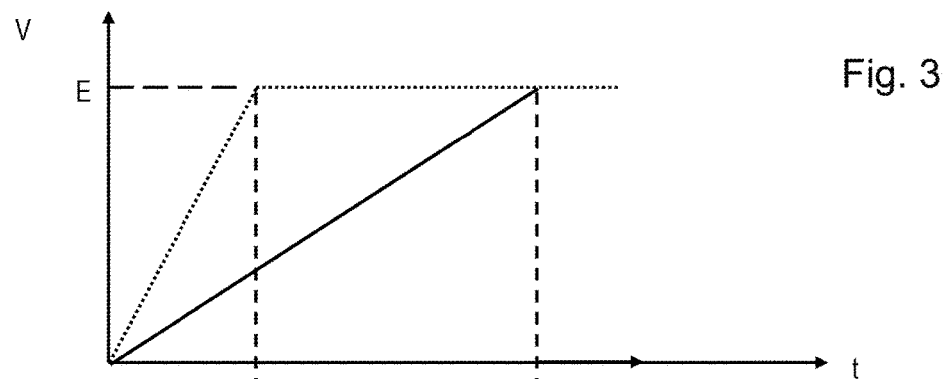
FIG. 3 illustrates diagrams showing voltage across the terminals of a decoupling capacitor in two operating configurations.
Figure 4:
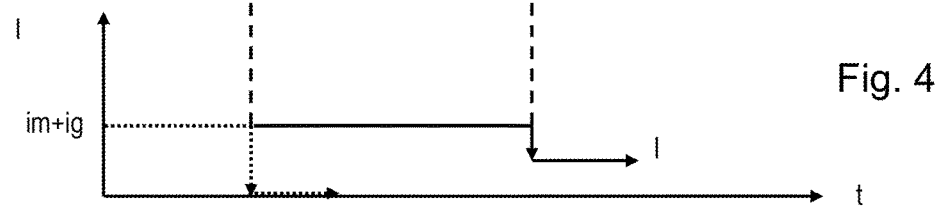
FIG. 4 illustrates diagrams showing current delivered by a power supply system in the same operating configurations as FIG. 3.

FIG. 3 is a diagram illustrating the voltage across the terminals of the capacitor 41 during a charging phase under two different operating conditions. FIG. 4 is a diagram illustrating the current delivered by the voltage source 2 under these two operating conditions.

The dotted curve illustrates an operating condition whereunder the load 4 and the electrical consumer 44 in particular do not draw current during the mode for charging the capacitor 41. The entirety of the current Il (regulated at a value Ir=Im+Ig) is applied to the capacitor 41, then giving a current Ic in the branch of the capacitor 41 such that Ic=Il. The voltage V across the terminals of the capacitor 41 increases linearly with time. Assuming that the voltage drops in the second branch are zero when the switch 303 is closed, the voltage V reaches the voltage E between the poles of the source 2. As the current I drawn by the electrical consumer 44 is zero, the current delivered by the voltage source 2 becomes zero. The control circuit 304 subsequently toggles to the operating mode for supplying power to the load 4, closes the contactor 51 and opens the switch 302. These switching operations are then carried out with zero potential differences between the terminals of the contactor 51 and between the terminals of the switch 302.

The solid curve illustrates an operating condition whereunder the electrical consumer 44 draws a non-zero current I during the mode for charging the capacitor 41. The mean current Il flowing through the inductor 305 is regulated at the value Ir. The value of the current for charging the capacitor Ic is then Ir–I=Il–I. The voltage V across the terminals of the capacitor 41 increases linearly with time, but more slowly than under the preceding operating condition. Still assuming that the voltage drops in the second branch are zero when the switch 303 is closed, the voltage V eventually reaches the voltage E between the poles of the source 2 later. The capacitor is charged. The current delivered by the voltage source 2 becomes equal to the current consumed by the electrical consumer I. The control circuit 304 subsequently toggles to the operating mode for supplying power to the load 4, closes the contactor 51 and opens the switch 302. These switching operations are then carried out with zero potential differences between the terminals of the contactor 51 and between the terminals of the switch 302. Additionally, due to the switching operations controlled by the control circuit 304 on the switch 303, the switch 302 may be opened with zero current, thereby allowing a switch 302 with a relatively low DC breaking power to be used. The switch 302 could, for example, be an electromechanical switch with contacts in air, which would not be suitable for breaking the direct current Il. The current I drawn by the electrical consumer 44 is then delivered via the contactor 51 of the first branch.

Due to a linear charging of the capacitor 41 in the mode for charging the control circuit 304, the charging time of the capacitor 41 is greatly reduced. Additionally, the second branch may omit the protective resistor in series with the switches 302 and 303, so that the majority of the energy delivered by the source 2 is used for recharging the capacitor 41, so that the losses due to Joule heating are minimal in charging mode. As the energy efficiency for switch-mode circuits is typically between 90 and 98%, a switch 303 thus controlled allows the losses to be limited when charging the capacitor 41.

When the charging mode switch 303 is opened, a freewheeling current is set up through the diodes 307 to 309 that form the unidirectional conduction device.

The control circuit 304 will be able to determine the occurrence of a malfunction if the voltage across the terminals of the capacitor has not reached a sufficient voltage by the end of a predetermined duration. In such a case, at the end of this duration, the control circuit toggles from the mode for charging the capacitor 41 to a safe mode, wherein it keeps both the contactor 51 and the switch 302 open.

The predetermined duration will, for example, be set as the duration required for the regulation current Ir to allow the capacitor 41 to be charged completely when the electrical consumer 44 consumes its maximum current Im. This duration will advantageously be shorter than three seconds in order to make the electrical load 4 quickly usable after a command to connect the voltage source 2 to this electrical load 4.

The switch 303 may typically be a transistor whose switching regime is controlled by the circuit 304. The transistor may be controlled by the circuit 304, e.g. at a set frequency with pulse-width modulation, or at a variable frequency.

In order to protect the second branch in the event of an overcurrent linked to a short circuit on the switch 303, a fuse 301 is advantageously connected in series with the switches 302 and 303.

The sizing of the circuit 3 essentially depends on the sizing, in terms of energy, of the inductor 305. Depending on the capacitance of the capacitor 41 to be charged, one and the same circuit 3 could be used by changing the inductor 305 and by adjusting the value of the regulation current of the control circuit 304.

The invention allows particularly advantageous levels of performance to be attained, with components that are in very common use in the field of switch-mode power supplies and have relatively common sizings for the inductor 305, the switch 303 and the diodes 307 to 309. Additionally, for a switch 303 in the form of a transistor, the use of the circuit 3 for a reduced duration of charging the capacitor 41 allows heat sinks of limited dimension to be used, or even to be omitted altogether. Likewise, it is possible to omit heat sinks for the inductor 305 and to minimize the cost and size of the latter while tolerating higher loss levels, e.g. by choosing a higher magnetic excursion and/or a higher current density in the windings. Conventionally, in a converter, the loss level from the inductor is of the order of 1 to 2%. For the invention, a loss level of 5% to 10% may be chosen, for example. The invention still achieves an efficiency that is much improved with respect to the solutions of the prior art, at a reduced size and inductor cost.

Figure 5:
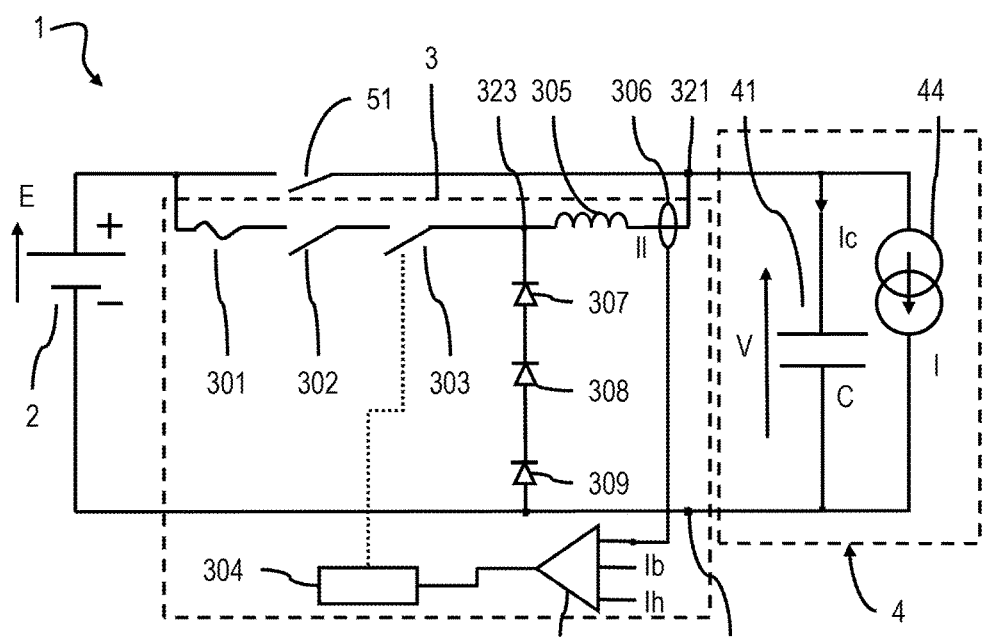
FIG. 5 is a schematic representation of a second embodiment of a power supply system according to the invention associated with an electrical load.

FIG. 5 is a schematic representation of a second embodiment of a DC voltage electrical power supply system 1 according to the invention, associated with the electrical load 4. The structure of the second branch and of the unidirectional conduction device of the first embodiment is used again in this instance.

Figure 6:
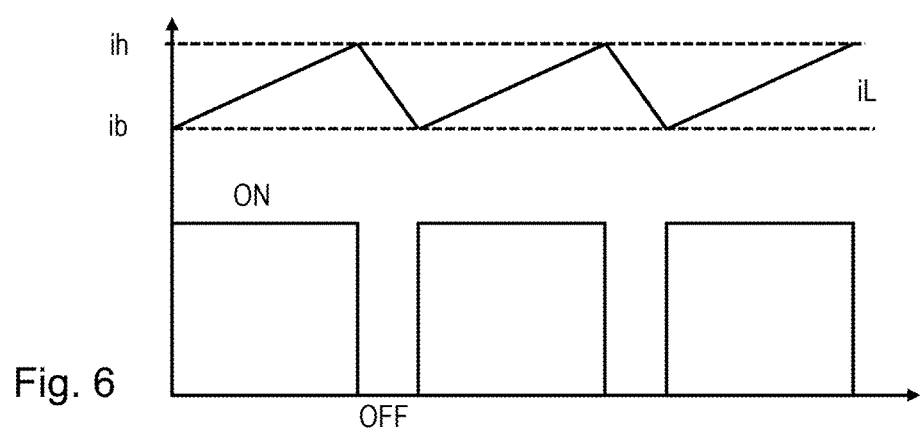
FIG. 6 is a timing diagram illustrating the current delivered by a power supply system depending on control signals applied to a load switch.

The regulation of the current flowing through the inductor 305 in the mode for charging the capacitor 41 uses, in this instance, a mode for regulation by hysteresis with variable-frequency mode-switching. The probe 306 measures the current flowing through the inductor 305. The current measured by the probe 306 is compared by a comparator 310 to thresholds. As illustrated in the diagram of FIG. 6, the switch 303 is opened when the current Il reaches an upper threshold ih, and closed when the current Il reaches a lower threshold Ib. Due to variations in slope of the current in the inductor 305 while the capacitor 41 is charging, the circuit 3 is then a variable-frequency circuit. The mean current delivered by the inductor is then (ih+ib)/2.

One embodiment (not illustrated) may implement regulation with control of the switch 303 by pulse-width modulation. To this end, a current flowing through the inductor is measured by a probe. The value measured by the probe is applied to the input of an amplifier. The amplifier compares this measured value to a setpoint current value. The amplifier generates an error value, which may be applied to a proportional/integral corrector. The output of this proportional/integral corrector may control the duty cycle for closing the switch 303. The switch 303 operates then at a set frequency and with a variable duty cycle.

Figure 7:
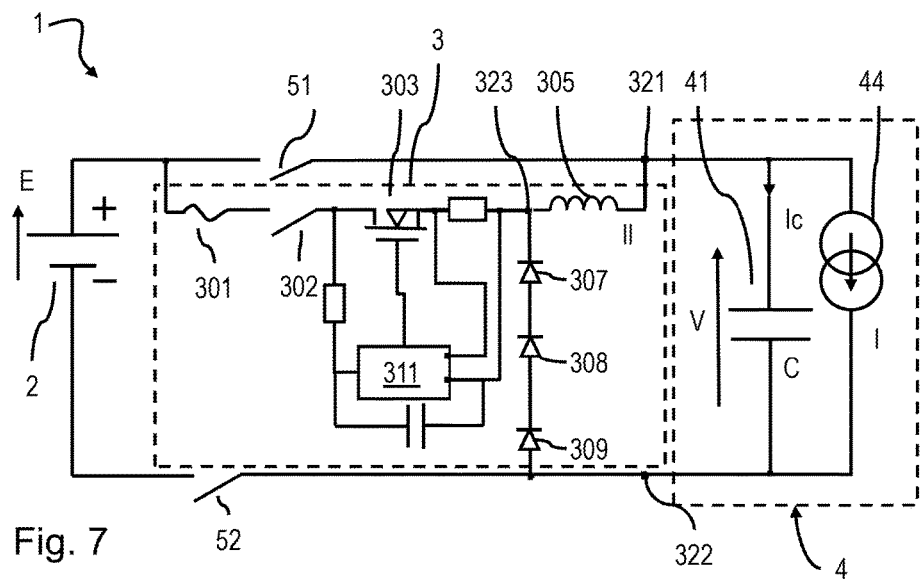
FIG. 7 is a schematic representation of a third embodiment of a power supply system according to the invention associated with an electrical load.

FIG. 7 is a schematic representation of a third embodiment of a DC voltage electrical power supply system 1 according to the invention, associated with the electrical load 4. The structure of the second branch and of the unidirectional conduction device of the first embodiment is used again in this instance. Additionally, the system 1 comprises, in this instance, a contactor 52 selectively connecting the negative pole of the source 2 and the terminal 322, so that the high-power coupling circuit has an increased level of safety.

Figure 8:
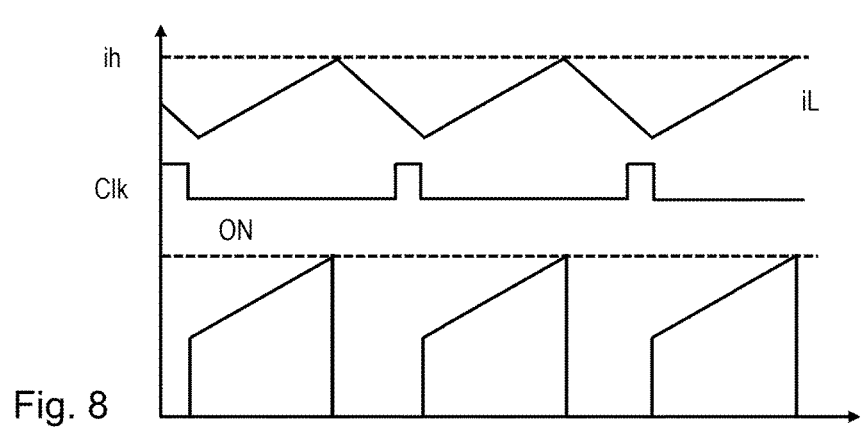
FIG. 8 is a timing diagram illustrating the current delivered by a power supply system depending on various control signals.

The regulation of the current flowing through the inductor 305 is, in this instance, carried out via pulse-width modulation in current mode. The control circuit is, in this instance, implemented in the form of a monitoring circuit 311. The switch 303 is closed at a fixed frequency by the monitoring circuit 311. The switch 303 is, in this instance, an N-type MOS transistor. As illustrated in FIG. 8, the monitoring circuit 311 closes the transistor 303 on each clock pulse and the monitoring circuit 311 opens the transistor 303 when a threshold of current Ih flowing through the transistor 303 is reached. The upper curve illustrates the current flowing through the inductor 305. The middle curve illustrates a clock signal. The transistor is turned on on the falling edge of the clock. The lower curve illustrates the current flowing through the transistor 303. A monitoring circuit 311 implementing such a regulation mode is, in particular, marketed under the trade reference UC3842. Such a monitoring circuit reads current via resistors.

The switch 303 may be a transistor, e.g. of MOSFET or bipolar type. Other types of switches 303 may of course be used, e.g. an IGBT transistor.

In practice, the inductor 305 operates for a relatively limited time. The inductor 305 may then be made with an iron powder core operating at high fields with a copper winding of relatively small cross section.

In the preceding examples, the circuit 3 forms a second interconnection branch in parallel to the contactor 51. It may also be envisaged that the circuit 3 forms a second interconnection branch in parallel to a contactor that selectively connects the negative pole of the source 2 to the terminal 322.

When the high-power coupling circuit 5 comprises contactors 51 and 52, the contactor with no branch in parallel is opened beforehand, when the source 2 is disconnected from the load 4, the circuit 3 then being able to remain supplied with power. Then the other contactor with the branch in parallel is opened.

The invention claimed is:

1. An electrical system, comprising:
an electrical load that is liable to consume a maximum current;
a decoupling capacitor connected in parallel to terminals of the electrical load; and
a DC voltage electrical power supply system, including a first terminal and a second terminal for applying a supply voltage to the first terminal and the second terminal of the electrical load, including:
a DC voltage source including a first pole and a second pole, the second pole being connected to the second terminal of the electrical power supply system;
a first branch including a first contactor selectively connecting the first pole of the DC voltage source to the first terminal of the electrical power supply system;
a second branch including a first switch a second switch, and an inductor that are connected in series in order to selectively connect the first pole of the DC voltage source to the first terminal of the electrical power supply system;
a device for unidirectional conduction from the second terminal of the DC power supply system to a connection node between the second switch and the inductor; and
a control circuit including:
a first mode for supplying power to the electrical load, wherein the control circuit keeps the first contactor closed; and
a second mode for charging the decoupling capacitor, wherein the control circuit keeps the first contactor open, the control circuit keeps the first switch closed and controls switching actions of the second switch so as to output a current regulated to a level higher than the maximum current via the inductor, and the control circuit toggles to the first mode for supplying power to the electrical load from the second mode for charging the decoupling capacitor when the control circuit determines that the supply voltage between the first terminal and second terminal exceeds a first threshold.

2. The electrical system as claimed in claim 1, wherein the second switch includes a transistor whose switching regime is controlled by the control circuit.

3. The electrical system as claimed in claim 1, wherein the first switch is an electromechanical switch.

4. The electrical system as claimed in claim 1, wherein the second pole of the DC voltage source and the second terminal of the electrical power supply system are selectively connected via a second contactor, the control circuit keeping the second contactor closed in the first mode for supplying power to the electrical load and in the second mode for charging the decoupling capacitor.

5. The electrical system as claimed in claim 1, wherein the control circuit includes a safe mode wherein the control circuit keeps the first contactor open and the first switch open, the control circuit determining the duration of an operation in the first mode or the second mode, and controlling the toggling to the safe mode when the determined duration exceeds a first threshold.

6. The electrical system as claimed in claim 1, wherein the control circuit is configured to measure the voltage between the first pole and the second pole and configured to determine the first threshold by subtracting a predefined value from the measured voltage.

7. The electrical system as claimed in claim 1, wherein the regulated current level of the second mode results in a complete charging of the decoupling capacitor in a duration of less than three seconds when the electrical load consumes the current.

8. The electrical system as claimed in claim 1, wherein the DC voltage source applies a voltage that is higher than 100 V across the first pole and the second pole.

9. The electrical system as claimed in claim 1, wherein the first switch and the second switch are connected in series between the first pole of the DC voltage source and the connection node.

10. A DC voltage electrical power supply system for applying a supply voltage to a first terminal and a second terminal of an electrical load of an electrical system, comprising:
a DC voltage source including a first pole and a second pole, the second pole being connected to the second terminal of the electrical power supply system;
a first branch including a first contactor selectively connecting the first pole of the DC voltage source to the first terminal of the electrical power supply system;
a second branch including a first switch a second switch, and an inductor that are connected in series in order to selectively connect the first pole of the DC voltage source to the first terminal of the electrical power supply system;
a device for unidirectional conduction from the second terminal of the DC power supply system to a connection node between the second switch and the inductor; and
a control circuit including:
a first mode for supplying power to the electrical load, wherein the control circuit keeps the first contactor closed; and
a second mode for charging the decoupling capacitor, wherein the control circuit keeps the first contactor open, the control circuit keeps the first switch closed and controls switching actions of the second switch so as to output a current regulated via the inductor to a level higher than the maximum current that is liable to be consumed by the electrical load, and the control circuit toggles to the first mode for supplying power to the electrical load from the second mode for charging the decoupling capacitor when the control circuit determines that the supply voltage between the first terminal and the second terminal exceeds a first threshold.

* * * * *